Patented Nov. 28, 1944

2,363,873

UNITED STATES PATENT OFFICE 2,363,873

PROCESS FOR RECLAIMING WASTE POLYCHLOROPRENES

Walter G. Kirby and Leo E. Steinle, Naugatuck, Conn., assignors to United States Rubber Company, New York, N. Y., a corporation of New Jersey No Drawing. Application April 24, 1943, Serial No. 484,486

20 Claims. (Cl. 260—92.7)

This invention relates to a process for reclaiming scrap containing elastic polymerized chloro-2-butadiene-1,3 in its various forms, hereinafter referred to for convenience as polychloroprene, and more particularly to reclaiming such scrap in the "digester" or "heater" as used in the conventional reclaiming of vulcanized natural rubber scrap.

Plastic polymerized chloroprene in various forms and containing certain modifying and stabilizing agents is sold under the name of Neoprene in a number of types, such as E, M, G, GN, I, etc. Neoprene GN, an outstanding material, is understood to be prepared by polymerization of chloroprene in the presence of sulphur. Neoprene I is understood to be prepared by polymerization of chloroprene and a portion of an unsaturated nitrile in the presence of sulphur. When these various types of Neoprene are mixed with selected modifying agents, softeners, fillers, re'nforcing agents, etc., in the manner generally known to the art, and said mixtdres are subjected to a heating process, the Neoprene mixture is converted from a plastic to a tough elastic material by a process generally called curing or vulcanizing. The tough elastic body is referred to as vulcanized Neoprene. The vulcanization step may occur at low or high temperatures and may proceed to various degrees. If it takes place at or near room temperature or during processing, it is referred to as "scorching." The Neoprene mixtures in which "scorching" has proceeded to even a relatively slight degree cannot be satisfactorily milled, tubed, calendered, or otherwise processed in the industry and so must be scrapped. For convenience "scorched" and fully vulcanized elastic Neoprene mixtures or products made from such mixtures will be referred to herein as vulcanized Neoprene.

The art of reclaiming vulcanized natural rubber scrap is well known. In the usual "digester" process, a charge of ground rubber and water, or a solution of a cellulose-destroying chemical, such as caustic soda or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried or somewhat moistened condition is heated with steam under pressure in trays or pans in an autoclave until the rubber becomes plasticized. The plasticized scap is then removed from the "heater" and milled. The elevated temperatures in these reclaiming operations which range from approximately 300° F. to approximately 420° F. are desirable because they accelerate the reversion of vulcanization of the rubber, and speed up the action of oils and softening agents that are usually added as reclaiming aids. These higher temperatures are also desirable to accelerate and promote the rapid destruction of fiber when it is present.

Neoprene is different from natural rubber in that it does not combine with sulphur to bring about vulcanization and does not undergo reversion of vulcanization through the medium of heat, to change it from an elastic to a plastic form. On the contrary when heat and especially the higher temperatures referred to are applied to vulcanized Neoprene it becomes harder and is said to be further vulcanized. Therefore, one of the gerat difficulties in attempting to reclaim scrap vulcanized Neoprene is the fact that as the temperature is raised during the process to accelerate the action of oils and softening agents in plasticizing or otherwise breaking down the polymer to a plastic state, there occurs during the same period a gradual further polymerizing and hardening of the Neoprene, due to these temperatures, which counteracts any plasticizing effect accomplished. Scrap vulcanized fiber-free polychloroprene cannot be reclaimed in the conventional "digester" or "heater" under the conditions of time and temperature and with the reclaiming agents usually associated with the reclaiming of vulcanized natural rubber scrap. Fiber-containing vulcanized polychloroprene scrap may be reclaimed in the "digester."

By the present invention scrap containing vulcanized polychloroprene, or blends of vulcanized polychloroprene with vulcanized natural rubber, may be readily reclaimed, as in the conventional "digester" or "heater" processes. Fiber-free scrap containing vulcanized polychloroprene may be reclaimed under conditions of time and temperature approximating those usually employed in the reclaiming of vulcanized natural rubber scrap. Also the necessary time for reclaiming fiber-containing scrap including vulcanized polychloroprene in the "digester" is greatly reduced.

According to the present invention there is added to the scrap containing vulcanized polychloroprene a small amount of a di(hydroxyaryl) sulphide. The amount of di(hydroxyaryl) sulphide used may vary from .02 to 1% by weight of the scrap where natural rubber containing only a little of the vulcanized polychloroprene is to be reclaimed up to 6% or more by weight of the scrap when reclaiming the straight vulcanized polychloroprene. The di(hydroxyaryl) sulphide may be added in any desired form, for example, as a gas or vapor, or as a liquid or a solid, or in suspension or solution in water or in organic solvents, or mixed with the oils or other materials that may also be added in the reclaiming process. The di(hydroxyaryl) sulphide may be a monosulphide, disulphide, or polysulphide, and the two hydroaromatic groups may be alike or different and may be unsubstituted or substituted, as with alkyl substituents. Examples of the chemicals which may be used according to the present invention are: di(hydroxyphenyl) monosulphide, di(hydroxyphenyl) disulphide, dicresyl or di(hydroxytolyl) monosulphide, dicresyl-disulphide or di(hydroxytolyl) disulphide, dicresyl polysulphide or di(hydroxytolyl) polysulphide, di(hydroxynaphthyl) disulphide, di(butyl hydroxyphenyl) monosulphide, di(butylhydroxyphenyl) disulphide, bis(dimethyl hydroxyphenyl) disulphide, hydroxyphenylcresyl monosulphide and cresyldimethyl hydroxyphenyl disulphide. The reclaiming in the "digester" or "heater" processes may take place at the usual temperatures of from about 300° F. to about 420° F.

The effectiveness of a reclaiming operation in recovering scrap vulcanized rubber or synthetic rubber-like material, such as polychloroprene, may be quantitatively shown by means of an instrument widely used for this purpose in the reclaim rubber industry, namely, the Mooney Shearing Disc Plastometer. This device has been described by M. Mooney in Industrial & Engineering Chemistry, an. ed. 6, 147 (1934). By means of this device the viscosity of a plastic material in shear may be readily and quantitatively measured. Experience has shown that materials with a Mooney viscosity of 80 to 180 when tested at 180° F. can be readily and efficiently processed on standard rubber working machinery, but that materials of a very high viscosity such as 200 and over when tested at 180° F. cannot be so treated.

The following examples are given in illustration of the invention:

Example I

Fiber-free vulcanized Noeprene scrap was reduced to a desired particle size and different portions were then mixed with reagents according to each of the following formulations, formulation B including di(hydroxyaryl) sulphide, formulation A not including same.

|  | A | B |
|---|---|---|
|  | Parts by weight | Parts by weight |
| Ground vulcanized fiber-free Neoprene scrap | 100 | 100 |
| Pine oil fraction | 20 | 20 |
| Rosin oil | 10 | 10 |
| Crude dicresyl disulphide |  | 4 |
| Water | 2 | 2 |

Charges A and B were each treated in a "heater" at 388° F. for 10 hours. After these treatments, the products were removed from the "heaters," dried and subjected to the usual milling process. After milling, product A had a Mooney viscosity at 180° F. of 250, and product B had a Mooney viscosity at 180° F. of 108.

Example II

Fiber-free vulcanized Neoprene scrap was reduced to a desired particle size and different portions were then mixed according to each of the following formulations, formulation D including di(hydroxyaryl) sulphide and C a similar formulation not containing this reagent.

|  | C | D |
|---|---|---|
|  | Parts by weight | Parts by weight |
| Ground vulcanized fiber-free neoprene scrap | 100 | 100 |
| Pine oil fraction | 12 | 12 |
| Rosin oil | 10 | 10 |
| Crude dicresyl disulphide |  | 3 |
| Water | 260 | 260 |

Charges C and D were each heated in a "digester" at 388° F. for 5 hours. After these treatments, the products were removed from the "digesters," washed and dried and subjected to the usual milling process. After milling, product C had a Mooney viscosity at 180° F. of 180, and product D had a Mooney viscosity at 180° F. of 88.

Example III

In this case Neoprene scrap containing fiber in addition to fiber-free Neoprene scrap was reclaimed in a "digester." The vulcanized fiber-free and fiber-containing Neoprene scrap was reduced to a desired particle size and different portions were then mixed according to each of the following formulations, formulation E containing di(hydroxyaryl) sulphide and zinc chloride, formulation F being the same as E but without the di(hydroxyaryl) sulphide, and formulation G omitting both the di(hydroxyaryl) sulphide and zinc chloride.

|  | E | F | G |
|---|---|---|---|
|  | Parts by weight | Parts by weight | Parts by weight |
| Ground vulcanized fiber-free Neoprene scrap | 65 | 65 | 65 |
| Ground vulcanized fiber-containing Neoprene scrap | 35 | 35 | 35 |
| Pine oil fraction | 12 | 12 | 12 |
| Rosin oil | 10 | 10 | 10 |
| Crude dicresyl disulphide | 4 |  |  |
| Zinc chloride | 7 | 7 |  |
| Water | 200 | 200 | 200 |

Charges E and F were heated in a "digester" at 388° F. for 5 hours. Charge G was heated in a "digester" at 388° F. for 16 hours. After these treatments, the products were removed from the "digesters," washed and dried, and subjected to the usual milling process. Product E was found to have a Mooney viscosity at 180° F. of 80, while product F had a Mooney viscosity at 180° F. of over 200, showing that five hours were sufficient for a satisfactory reclaiming of the Neoprene scrap containing fibrous material in the presence of the di (hydroxyaryl) sulphide, whereas a satisfactory reclaim could not be obtained in five hours under the same conditions in the absence of this chemical. Product G had a Mooney viscosity at 180° F. of 92, showing a satisfactory product with a normal time of treatment of sixteen hours in the "digester." It is clear that the addition of di (hydroxyaryl) sulphide reduces the time of treatment in the "digester" of polychloroprene scrap containing fibrous material.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process for reclaiming scrap containing vulcanized polychloroprene which comprises heating the same while in a subdivided condition at a temperature from about 300° F. to about 420° F. in the presence of a di (hydroxyaryl) sulphide.

2. A process for reclaiming scrap containing vulcanized polychloroprene which comprises heating the same while in a subdivided condition at a temperature from about 300 F. to about 420° F. in the presence of a di (hydroxytolyl) sulphide.

3. A process for reclaiming scrap containing vulcanized polychloroprene which comprises heating the same while in a subdivided condition at a temperature from about 300° F. to about 420° F. in the presence of di (hydroxytolyl) monosulphide.

4. A process for reclaiming scrap containing vulcanized polychloroprene which comprises heating the same while in a subdivided condition at a temperature from about 300° F. to about 420° F. in the presence of di (hydroxytolyl) disulphide.

5. A process for reclaiming scrap containing vulcanized polychloroprene which comprises heating the same while in a subdivided condition at a temperature from about 300° F. to about 420° F. in the presence of di (hydroxytolyl) polysulphide.

6. A process for reclaiming scrap containing vulcanized polychloroprene which comprises heating the same while in a sub-divided condition at a temperature from about 300° F. to about 420° F. in the presence of a di (hydroxyaryl) sulphide and for a time sufficient to reduce the vulcanized polychloroprene to a plastic state where it has a Mooney viscosity substantially less than 200 when tested at 180° F.

7. A process for reclaiming scrap containing vulcanized polychloroprene which comprises heating the same while in a sub-divided condition at a temperature from about 300° F. to about 420° F. in the presence of a di (hydroxytolyl) sulphide and for a time sufficient to reduce the vulcanized polychloroprene to a plastic state where it has a Mooney viscosity substantially less than 200 when tested at 180° F.

8. A process for reclaiming scrap containing vulcanized polychloroprene which comprises heating the same while in a sub-divided condition at a temperature from about 300° F. to about 420° F. in the presence of di (hydroxytolyl) monosulphide and for a time sufficient to reduce the vulcanized polychloroprene to a plastic state where it has a Mooney viscosity substantially less than 200 when tested at 180° F.

9. A process for reclaiming scrap containing vulcanized polychloroprene which comprises heating the same while in a sub-divided condition at a temperature from about 300° F. to about 420° F. in the presence of di(hydroxytolyl) disulphide and for a time sufficient to reduce the vulcanized polychloroprene to a plastic state where it has a Mooney viscosity substantially less than 200 when tested at 180° F.

10. A process for reclaiming scrap containing vulcanized polychloroprene which comprises heating the same while in a subdivided condition at a temperature from about 300° F. to about 420° F. in the presence of di (hydroxytolyl) polysulphide and for a time sufficient to reduce the vulcanized polychloroprene to a plastic state where it has a Mooney viscosity substantially less than 200 when tested at 180° F.

11. A process for reclaiming scrap containing vulcanized polychloroprene which comprises heating the same in a "digester" or a "heater" at a temperature from about 300° F. to about 420° F. in the presence of a di (hydroxyaryl) sulphide and for a time sufficient to reduce the vulcanized polychloroprene to a plastic state where it has a Mooney viscosity of 80 to 180 when tested at 180° F.

12. A process for reclaiming scrap containing vulcanized polychloroprene which comprises heating the same in a "digester" or a "heater" at a temperature from about 300° F. to about 420° F. in the presence of a di (hydroxytolyl) sulphide and for a time sufficient to reduce the vulcanized polychloroprene to a plastic state where it has a Mooney viscosity of 80 to 180 when tested at 180° F.

13. A process for reclaiming scrap containing vulcanized polychloroprene which comprises heating the same in a "digester" or a "heater" at a temperature from about 300° F. to about 420° F. in the presence of di (hydroxytolyl) monosulphide and for a time sufficient to reduce the vulcanized polychloroprene to a plastic state where it has a Mooney viscosity of 80 to 180 when tested at 180° F.

14. A process for reclaiming scrap containing vulcanized polychloroprene which comprises heating the same in a "digester" or a "heater" at a temperature from about 300° F. to about 420° F. in the presence of di (hydroxytolyl) disulphide and for a time sufficient to reduce the vulcanized polychloroprene to a plastic state where it has a Mooney viscosity of 80 to 180 when tested at 180° F.

15. A process for reclaiming scrap containing vulcanized polychloroprene which comprises heating the same in a "digester" or a "heater" at a temperature from about 300° F. to about 420° F. in the presence of di(hydroxytolyl) polysulphide and for a time sufficient to reduce the vulcanized polychloroprene to a plastic state where it has a Mooney viscosity of 80 to 180 when tested at 180° F.

16. A process for reclaiming scrap containing vulcanized polychloroprene which comprises incorporating therein a di (hydroxyaryl) sulphide and heating the same while in a subdivided condition for a time sufficient to reduce the vulcanized polychloroprene to a plastic state where it has a Mooney viscosity substantially less than 200 when tested at 180° F.

17. A process for reclaiming scrap containing vulcanized polychloroprene which comprises incorporating therein a di (hydroxytolyl) sulphide and heating the same while in a subdivided condition for a time sufficient to reduce the vulcanized polychloroprene to a plastic state where it has a Mooney viscosity substantially less than 200 when tested at 180° F.

18. A process for reclaiming scrap containing vulcanized polychloroprene which comprises incorporating therein di (hydroxytolyl) monosulphide and heating the same while in a subdivided condition for a time sufficient to reduce the vulcanized polychloroprene to a plastic state where it has a Mooney viscosity substantially less than 200 when tested at 180° F.

19. A process for reclaiming scrap containing vulcanized polychloroprene which comprises incorporating therein di (hydroxytolyl) disulphide and heating the same while in a subdivided condition for a time sufficient to reduce the vulcanized polychloroprene to a plastic state where it has a Mooney viscosity substantially less than 200 when tested at 180° F.

20. A process for reclaiming scrap containing vulcanized polychloroprene which comprises incorporating therein di (hydroxytolyl) polysulphide and heating the same while in a subdivided condition for a time sufficient to reduce the vulcanized polychloroprene to a plastic state where it has a Mooney viscosity substantially less than 200 when tested at 180° F.

WALTER G. KIRBY.
LEO E. STEINLE.